(12) United States Patent
Maeda et al.

(10) Patent No.: US 10,160,853 B2
(45) Date of Patent: Dec. 25, 2018

(54) THERMOPLASTIC RESIN COMPOSITION AND MOLDED ARTICLE THEREOF

(71) Applicant: UMG ABS, LTD., Tokyo (JP)

(72) Inventors: Kazuhiko Maeda, Ube (JP); Hironori Matsuyama, Ube (JP)

(73) Assignee: UMG ABS, LTD., Tokyo (JP)

( * ) Notice: Subject to any disclaimer, the term of this patent is extended or adjusted under 35 U.S.C. 154(b) by 88 days.

(21) Appl. No.: 15/125,843

(22) PCT Filed: Mar. 20, 2015

(86) PCT No.: PCT/JP2015/058443
§ 371 (c)(1),
(2) Date: Sep. 13, 2016

(87) PCT Pub. No.: WO2015/151853
PCT Pub. Date: Oct. 8, 2015

(65) Prior Publication Data
US 2017/0002189 A1 Jan. 5, 2017

(30) Foreign Application Priority Data

Mar. 31, 2014 (JP) .................................. 2014-074061

(51) Int. Cl.
| | | |
|---|---|---|
| *C08L 33/12* | (2006.01) | |
| *C08L 51/04* | (2006.01) | |
| *C08L 51/06* | (2006.01) | |
| *C08F 220/14* | (2006.01) | |
| *C08F 255/06* | (2006.01) | |
| *C08F 265/06* | (2006.01) | |
| *C08F 279/02* | (2006.01) | |
| *C08F 220/18* | (2006.01) | |

(52) U.S. Cl.
CPC ............ *C08L 33/12* (2013.01); *C08F 220/14* (2013.01); *C08F 255/06* (2013.01); *C08F 265/06* (2013.01); *C08F 279/02* (2013.01); *C08L 51/04* (2013.01); *C08L 51/06* (2013.01); *C08F 220/18* (2013.01); *C08L 2201/08* (2013.01); *C08L 2205/06* (2013.01)

(58) Field of Classification Search
CPC combination set(s) only.
See application file for complete search history.

(56) References Cited

U.S. PATENT DOCUMENTS

| | | | |
|---|---|---|---|
| 3,520,953 A | 7/1970 | Sugimoto et al. | |
| 4,743,646 A * | 5/1988 | Miura | ...................... C08K 7/02 524/494 |
| 2009/0104466 A1* | 4/2009 | Sumimoto | .............. B32B 25/08 428/480 |
| 2013/0221293 A1* | 8/2013 | Shirakawa | .............. C08L 69/00 252/601 |
| 2013/0345362 A1 | 12/2013 | Maeda et al. | |

FOREIGN PATENT DOCUMENTS

| | | |
|---|---|---|
| JP | H06-041443 A | 2/1994 |
| JP | H11-349785 A | 12/1999 |
| JP | 2000-212373 A | 8/2000 |
| JP | 2001-253990 A | 9/2001 |
| JP | 2004-346237 A | 12/2004 |
| JP | 2007-191632 A | 8/2007 |
| JP | 2009-120705 A | 6/2009 |

OTHER PUBLICATIONS

Nishimoto et al., electronic translation of JP 2001253990 (Sep. 2001).*
PCT/ISA/210, "International Search Report for International Application No. PCT/JP2015/058443," dated Apr. 21, 2015.
Europe Patent Office, "Search Report for European Patent Application No. 15774030.9," dated Oct. 12, 2017.

* cited by examiner

*Primary Examiner* — Jeffrey C Mullis
(74) *Attorney, Agent, or Firm* — Manabu Kanesaka

(57) ABSTRACT

A thermoplastic resin composition is highly resistant to thermal discoloration during retention in a molding process and provides molded articles excellent in fluidity, impact resistance, heat resistance, surface appearance, color reproduction properties and vibration damping properties. A thermoplastic resin composition includes 20 to 70 parts by mass of a graft copolymer (A) obtained by graft copolymerizing a vinyl monomer selected from unsaturated nitrile monomers, aromatic vinyl monomers and (meth)acrylate ester monomers, in the presence of a rubbery polymer having a volume average particle diameter of 80 to 600 nm; and 30 to 80 parts by mass of a copolymer (B) obtained by copolymerizing a vinyl monomer mixture including vinyl monomers selected from unsaturated nitrile monomers, aromatic vinyl monomers and (meth)acrylate ester monomers, the vinyl monomer mixture including styrene and α-methylstyrene as the aromatic vinyl monomers, (total of the graft copolymer (A) and copolymer (B) is 100 parts by mass).

8 Claims, 1 Drawing Sheet

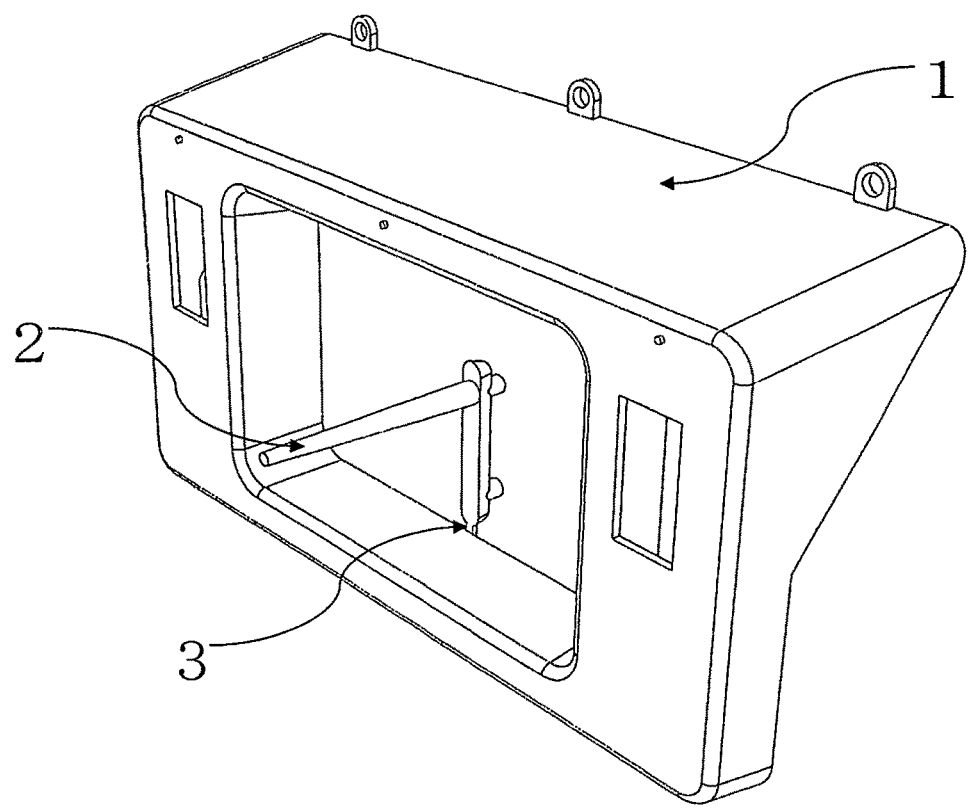

THERMOPLASTIC RESIN COMPOSITION AND MOLDED ARTICLE THEREOF

FIELD OF THE INVENTION

The present invention relates to a thermoplastic resin composition which is highly resistant to thermal discoloration during retention in a molding process and can give molded articles excellent in fluidity, impact resistance, heat resistance, surface appearance, color reproduction properties and vibration damping properties, and to a thermoplastic resin molded article obtained by molding the thermoplastic resin composition.

BACKGROUND OF THE INVENTION

Thermoplastic resins such as styrene resins represented by ABS resins, and alloy materials including styrene resins and other thermoplastic resins are widely used in the fields of, for example, electric and electronic devices, OA and home appliances, vehicles and sanitary products due to their excellent properties such as mechanical characteristics, physical characteristics and electrical characteristics. In association with recent trends such as weight reduction and miniaturization of products, molded articles are reduced in thickness. In the case of, for example, injection molding, thermoplastic resins are subjected to severe conditions such as increased molding temperature and higher injection rate which are necessary in order to obtain thin molded articles. During a molding process with a large molding apparatus, the resin tends to be retained in the cylinder of the molding apparatus and is consequently degraded or thermally decomposed to cause defective molding phenomena such as jetting, and also thermal discoloration. Further, the resulting molded articles are poor in performance and surface appearance.

Thermal stability may be enhanced to a certain extent by adding various thermal stability improvers to thermoplastic resin compositions. This approach, however, increases costs.

Noises and vibrations have become a concern as a result of the recent changes in living environments. There has been a demand that noises and vibrations be reduced in the fields of vehicles, home appliances and OA devices. Materials in need are those capable of reducing vibrations of radiator fans in automobiles, noises from motors in the field of home appliances, and vibrations of optical disks in the field of OA devices.

An example of vibration insulating and vibration damping materials is resin or rubber materials sandwiched between metal plates. The recent weight reduction and miniaturization of devices have made it difficult to adopt such structures in the designing of products, and materials per se which form structures are required to have high vibration damping performance.

In general, highly rigid materials usable as structures by themselves have low vibration damping properties, while materials with high vibration damping properties are poor in rigidity. Because of this trade-off relationship, it is difficult to use resin compositions having vibration damping performance to form structures as such.

Japanese Patent Publication H6-41443A presents a combination of a thermoplastic resin with a copolymer which includes an acrylate ester monomer and/or a methacrylate ester monomer, and a comonomer and which has a glass transition temperature of not less than 0° C. Japanese Patent Publication H11-349785A proposes that a rubbery polymer having a specific core-shell structure is added to a styrene resin. These resin compositions are incapable of giving molded articles with excellent molding processability and excellent surface appearance while still ensuring vibration damping properties.

Japanese Patent Publication 2000-212373A presents a thermoplastic resin composition including a (meth)acrylate ester copolymer and an additional copolymer wherein the thermoplastic resin composition has a loss tangent (tan δ) peak in a specific temperature range different from the Tg peaks of the respective polymers constituting the composition. While this resin composition attains enhancements in molding processability and surface appearance, no effects are obtained in terms of the resistance of the resin composition to thermal discoloration.

Patent Literature 1: Japanese Patent Publication H6-41443A

Patent Literature 2: Japanese Patent Publication H11-349785A

Patent Literature 3: Japanese Patent Publication 2000-212373A

SUMMARY OF THE INVENTION

An object of the invention is to provide a thermoplastic resin composition which is highly resistant to thermal discoloration during retention in a molding process and can give molded articles excellent in fluidity, impact resistance, heat resistance, surface appearance, color reproduction properties and vibration damping properties.

The present inventors have found that the problems discussed above can be solved by using a thermoplastic resin composition that is obtained by melt kneading a copolymer prepared by copolymerizing vinyl monomers with a specific ratio wherein the vinyl monomers essentially include styrene and α-methylstyrene as aromatic vinyl monomers, together with a graft copolymer.

A summary of the invention is as described below.

[1] A thermoplastic resin composition comprising:

20 to 70 parts by mass of a graft copolymer (A) obtained by graft copolymerizing a vinyl monomer selected from the group consisting of unsaturated nitrile monomers, aromatic vinyl monomers and (meth)acrylate ester monomers, in the presence of a rubbery polymer (a) having a volume average particle diameter of 80 to 600 nm; and 30 to 80 parts by mass of a copolymer (B) obtained by copolymerizing a vinyl monomer mixture including vinyl monomers selected from the group consisting of unsaturated nitrile monomers, aromatic vinyl monomers and (meth)acrylate ester monomers, the vinyl monomer mixture including styrene and α-methylstyrene as the aromatic vinyl monomers, the total of the graft copolymer (A) and the copolymer (B) being 100 parts by mass.

[2] The thermoplastic resin composition according to [1], wherein the vinyl monomer mixture includes 5 to 20 mass % of an unsaturated nitrile monomer, 10 to 30 mass % of aromatic vinyl monomers, 50 to 85 mass % of a (meth)acrylate ester monomer, and 0 to 10 mass % of an additional vinyl monomer.

[3] The thermoplastic resin composition according to [1] or [2], wherein the aromatic vinyl monomers in the vinyl monomer mixture include 5 to 30 mass % of styrene and 70 to 95 mass % of α-methylstyrene.

[4] The thermoplastic resin composition according to any one of [1] to [3], wherein the copolymer (B) is obtained by suspension polymerization.

[5] The thermoplastic resin composition according to [4], wherein the copolymer (B) is obtained by suspension polymerization using potassium alkenylsuccinate as a suspension auxiliary.

[6] The thermoplastic resin composition according to any one of [1] to [5], wherein the rubbery polymer (a) is an acrylic rubber including alkyl acrylate ester monomer units and polyfunctional monomer units, or an acrylic composite rubber that includes a polyorganosiloxane and an acrylic rubber including alkyl acrylate ester monomer units and polyfunctional monomer units.

[7] The thermoplastic resin composition according to any one of [1] to [6], wherein the graft copolymer (A) is one obtained by graft copolymerizing 60 to 20 mass % of the vinyl monomer selected from the group consisting of unsaturated nitrile monomers, aromatic vinyl monomers and (meth)acrylate ester monomers, in the presence of 40 to 80 mass % of the rubbery polymer (a).

[8] The thermoplastic resin composition according to any one of [1] to [7], wherein the graft copolymer (A) has a graft ratio of 20 to 150% and a reduced viscosity of acetone-soluble components of 0.30 to 0.70 dL/g, and the copolymer (B) has a reduced viscosity of 0.30 to 0.70 dL/g.

[9] The thermoplastic resin composition according to any one of [1] to [8], wherein the content of the rubbery polymer (a) relative to the whole of the thermoplastic resin composition is in the range of 10 to 30 mass %.

[10] A thermoplastic resin molded article obtained by molding the thermoplastic resin composition described in any one of [1] to [9].

Advantageous Effects of the Invention

The thermoplastic resin compositions of the present invention are highly resistant to thermal discoloration during retention in a molding process and can give molded articles excellent in fluidity, impact resistance, heat resistance, surface appearance, color reproduction properties and vibration damping properties. The thermoplastic resin compositions of the invention may be used in the fields of automobile components, building materials and home appliances which are recently growing in demand, and are therefore highly valuable in industry.

BRIEF DESCRIPTION OF DRAWING

FIGURE is a perspective view of a molded article fabricated as an automobile meter panel replica for the evaluation of appearance in Examples and Comparative Examples.

DESCRIPTION OF EMBODIMENTS

Embodiments of the present invention will be described in detail hereinbelow.

In the specification, the term "units" means structural moieties derived from compounds to be polymerized (monomers). For example, the term "vinyl monomer units" refers to "structural moieties derived from a vinyl monomer".

In the specification, the term "(meth)acrylic" indicates either or both of "acrylic" and "methacrylic".

[Graft Copolymer (A)]

The graft copolymer (A) is obtained by graft copolymerizing, in the presence of a rubbery polymer (a), a monomer component essentially including a vinyl monomer selected from unsaturated nitrile monomers, aromatic vinyl monomers and (meth)acrylate ester monomers and optionally including an additional vinyl monomer having copolymerizability with the above monomers.

Examples of the rubbery polymers (a) include diene rubbers, acrylic rubbers including alkyl acrylate ester monomer units and polyfunctional monomer units, ethylene-propylene rubbers (EPRs), ethylene-butene rubbers (EBRs), ethylene-octene rubbers (EORs), ethylene-propylene-diene rubbers (EPDMs) and polyorganosiloxanes.

Use may be made of an acrylic composite rubber obtained by a known method such as by polymerizing an alkyl acrylate ester monomer and a polyfunctional monomer in the presence of the above rubbery polymer, or by enlarging the above rubbery polymer by the addition of a rubbery polymer including an alkyl acrylate ester monomer and a polyfunctional monomer.

The rubbery polymers may be used singly, or two or more may be used in combination.

In order to ensure that the obtainable thermoplastic resin composition will exhibit excellent weather resistance and color reproduction properties, the rubbery polymer is preferably an acrylic rubber including alkyl acrylate ester monomer units and polyfunctional monomer units, or an acrylic composite rubber that includes a polyorganosiloxane and an acrylic rubber including alkyl acrylate ester monomer units and polyfunctional monomer units.

The rubbery polymer (a) is preferably produced by the emulsion polymerization of a mixture of monomers appropriately selected from the above-described monomers to form monomer units constituting the rubbery polymer (a).

The emulsifier used in the emulsion polymerization is preferably an anionic emulsifier because the latex formed during the emulsion polymerization exhibits excellent stability and the polymerization rate may be increased.

Examples of the anionic emulsifiers include carboxylate salts such as sodium sarcosinate, fatty acid potassium, fatty acid sodium, potassium alkenylsuccinate, dipotassium alkenylsuccinate and rosin acid soap, and dibasic acids or salts thereof having an alkyl group and/or an alkenyl group, such as alkyl sulfate ester salt, sodium alkylbenzenesulfonate, sodium alkylsulfosuccinate and sodium polyoxyethylene nonylphenyl ether sulfate ester.

In the dibasic acids or salts thereof having an alkyl group and/or an alkenyl group which are used as the anionic emulsifiers, the alkyl group is a linear, branched or cyclic alkyl group preferably having 8 to 22 carbon atoms, or more preferably 12 to 20 carbon atoms, with examples including various octyl groups, various decyl groups, various dodecyl groups, various tetradecyl groups, various hexadecyl groups, various octadecyl groups and various icosyl groups.

The alkenyl group is a linear, branched or cyclic alkenyl group preferably having 8 to 22 carbon atoms, or more preferably 12 to 20 carbon atoms, with examples including various octenyl groups, various decenyl groups, various dodecenyl groups, various tetradecenyl groups, various hexadecenyl groups, various octadecenyl groups and various icosenyl groups.

From points of view such as the tendency of the dispersion to aggregate, at least one of the acid groups in the dibasic acid is a carboxyl group. The other acid group may be, among others, a carboxyl group or a sulfonic group and, from points of view such as the tendency of the dispersion to aggregate, is preferably a carboxyl group. From points of view such as emulsifying performance, emulsion stability and aggregation tendency, it is preferable that the dibasic acid have an alkyl group and/or an alkenyl group with 8 to 22 carbon atoms, and one of the acid groups be a carboxyl group and the other acid group be a carboxyl group or a sulfonic group. It is more preferable that the dibasic acid be a dicarboxylic acid having an alkyl group and/or an alkenyl group with 8 to 22 carbon atoms. It is still more preferable that the dibasic acid be a dicarboxylic acid having an alkyl group and/or an alkenyl group with 12 to 20 carbon atoms.

The salts of the dibasic acids are preferably alkali metal salts such as sodium salts and potassium salts.

Specific examples of the dibasic acid salts include disodium monoalkyl succinate sulfonate, disodium alkylsuccinate, dipotassium alkylsuccinate, disodium alkenylsuccinate and dipotassium alkenylsuccinate. The number of carbon atoms in the alkyl group and/or the alkenyl group is preferably 8 to 22, and more preferably 10 to 20.

To prevent the hydrolysis of the polyfunctional monomers, the anionic emulsifier is preferably, among others, any of sodium sarcosinate, dipotassium alkenylsuccinate, alkyl sulfate ester salt, sodium alkylbenzenesulfonate, sodium alkylsulfosuccinate and sodium polyoxyethylene nonylphenyl ether sulfate ester. Of these, dipotassium alkenylsuccinates having an alkenyl group having 12 to 20 carbon atoms are particularly preferable because such emulsifiers have excellent emulsifying properties, storage stability, aggregation resistance and polymerization stability and may be used in combination with a wide range of coagulants.

The anionic emulsifiers may be used singly, or two or more may be used in combination.

The anionic emulsifier is usually used in a ratio of 0.1 to 4.0 parts by mass, and in particular 0.5 to 3.0 parts by mass relative to 100 parts by mass of the rubbery polymer (a).

From the points of view of the impact resistance and the appearance characteristics of molded articles of the obtainable thermoplastic resin composition, the volume average particle diameter of the rubbery polymer (a) as measured by the method described later in Examples is 80 to 600 nm, and preferably 90 to 500 nm.

The rubbery polymer (a) may be a mixture of two or more kinds of rubbery polymers differing in volume average particle diameter or types of rubbers.

The unsaturated nitrile monomer that is graft copolymerized to the rubbery polymer (a) may be, among others, one, or two or more of acrylonitriles and methacrylonitriles. In particular, acrylonitrile is preferable.

The aromatic vinyl monomer may be, among others, one, or two or more of styrene, α-methylstyrene, p-methylstyrene and bromostyrene. In particular, styrene and α-methylstyrene are preferable.

The (meth)acrylate ester monomer may be, among others, one, or two or more of alkyl methacrylate esters such as methyl methacrylate, ethyl methacrylate and n-butyl methacrylate, alkyl acrylate esters such as 2-ethylhexyl acrylate, methyl acrylate, ethyl acrylate and n-butyl acrylate, and 2-hydroxyethyl methacrylate. In particular, methyl methacrylate, methyl acrylate and n-butyl acrylate are preferable.

The additional vinyl monomer having copolymerizability with the above monomers may be, among others, one, or two or more of maleimide compounds such as N-phenylmaleimide and N-cyclohexylmaleimide, and unsaturated carboxylic acids such as acrylic acid, methacrylic acid, maleic acid, itaconic acid and fumaric acid.

Each of these monomers may be used singly, or two or more may be used in combination.

The monomer components that are graft copolymerized to the rubbery polymer (a) preferably include 80 to 100 mass % of a vinyl monomer(s) selected from unsaturated nitrile monomers, aromatic vinyl monomers and (meth)acrylate ester monomers, and 0 to 20 mass % of an additional vinyl monomer(s) having copolymerizability with the above monomers (relative to the monomer mixture taken as 100 mass %). If the proportion of the vinyl monomer(s) is below the above range and that of the additional vinyl monomer(s) is higher than the above range, the obtainable thermoplastic resin composition will be poor in any of impact resistance and appearance characteristics of molded articles.

In the case where the monomer components to be graft copolymerized to the rubbery polymer (a) include an unsaturated nitrile monomer and an aromatic vinyl monomer, the proportion of the unsaturated nitrile monomer in the monomer components is preferably 5 to 50 mass % and that of the aromatic vinyl monomer is preferably 50 to 95 mass % from points of view such as the impact resistance and the appearance characteristics of molded articles of the obtainable thermoplastic resin composition. When the monomer components to be graft copolymerized to the rubbery polymer (a) include an unsaturated nitrile monomer, an aromatic vinyl monomer and a (meth)acrylate ester monomer, the proportion of the unsaturated nitrile monomer in the monomer components is preferably 1 to 40 mass %, that of the aromatic vinyl monomer is preferably 10 to 76 mass %, and that of the (meth)acrylate ester monomer is preferably 20 to 80 mass % from points of view such as the impact resistance and the appearance characteristics of molded articles of the obtainable thermoplastic resin composition.

Specific examples of the monomer components to be graft copolymerized to the rubbery polymer (a) include acrylonitrile alone, styrene alone, methyl methacrylate alone, a mixture of acrylonitrile and styrene, a mixture of acrylonitrile and α-methylstyrene, a mixture of acrylonitrile, styrene and α-methylstyrene, a mixture of acrylonitrile, styrene and methyl methacrylate, a mixture of acrylonitrile, styrene and alkyl acrylate ester, and a mixture of methyl methacrylate and alkyl acrylate ester.

Of these, a mixture of acrylonitrile and styrene, a mixture of acrylonitrile, styrene and methyl methacrylate, and a mixture of methyl methacrylate and alkyl acrylate ester are preferable because the obtainable thermoplastic resin composition attains high impact resistance and good appearance characteristics of molded articles.

The graft copolymer (A) is preferably one obtained by graft copolymerizing 60 to 20 mass % of the monomer components in the presence of 40 to 80 mass % of the rubbery polymer (a) (relative to the graft copolymer (A) taken as 100 mass %). If the amount of the rubbery polymer (a) exceeds this range and that of the monomer components is less than the above range, the obtainable molded articles will have poor surface appearance. If the amount of the rubbery polymer (a) is less than this range and that of the monomer components exceeds the above range, the obtainable thermoplastic resin composition will have poor impact resistance.

The graft copolymer (A) may be produced by any method without limitation. A known method such as bulk polymerization, solution polymerization, bulk suspension polymerization, suspension polymerization or emulsion polymerization may be used.

To ensure a balance between the impact resistance of the obtainable thermoplastic resin composition and the appearance characteristics of the obtainable molded articles, it is preferable that the graft copolymer (A) have a graft ratio in the range of 20 to 150% as measured by the method described later in Examples. If the graft ratio of the graft copolymer (A) is less than 20%, the obtainable molded articles may have poor appearance characteristics. If the graft ratio is below 20% or is above 150%, the impact resistance of the obtainable thermoplastic resin composition may be deteriorated.

The reduced viscosity of acetone-soluble components of the graft copolymer (A) is preferably 0.30 to 0.70 dL/g, or in particular 0.30 to 0.50 dL/g. This lower limit of the reduced viscosity of acetone-soluble components of the graft copolymer (A) ensures that impact strength will be further increased. The above upper limit ensures good appearance of molded articles and also high molding properties. The reduced viscosity of acetone-soluble components of the graft copolymer (A) is measured by the method described later in Examples.

[Copolymer (B)]

The copolymer (B) is obtained by copolymerizing a mixture of vinyl monomers including an unsaturated nitrile monomer, aromatic vinyl monomers, a (meth)acrylate ester monomer and optionally an additional vinyl monomer having copolymerizability with the above monomers (hereinafter, the mixture is also written as the "vinyl monomer mixture (b)"). The mixture essentially includes styrene and α-methylstyrene as the aromatic vinyl monomers.

The monomers used in the copolymer (B), namely, the unsaturated nitrile monomers, the aromatic vinyl monomers, the (meth)acrylate ester monomers and the optional additional vinyl monomers having copolymerizability with the above monomers may be similar to those monomers used in the graft copolymer (A). Preferred examples of these monomers are also as described hereinabove. Acrylonitrile is particularly preferable as the unsaturated nitrile monomer, and methyl methacrylate is particularly preferable as the (meth)acrylate ester monomer.

The proportion of the unsaturated nitrile monomer(s) present in the vinyl monomer mixture (b) is preferably 5 to 20 mass %, and more preferably 5 to 15 mass %. This lower limit of the proportion of the unsaturated nitrile monomer(s) ensures that the obtainable thermoplastic resin composition will attain good impact resistance. With the proportion being at or below the upper limit, the obtainable thermoplastic resin composition will be prevented from thermal discoloration during retention in a molding process.

The proportion of the aromatic vinyl monomers present in the vinyl monomer mixture (b) is preferably 10 to 30 mass %, and more preferably 15 to 25 mass %. This lower limit of the proportion of the aromatic vinyl monomers ensures that the obtainable thermoplastic resin composition will attain good molding properties and heat resistance. With the proportion being at or below the upper limit, the obtainable thermoplastic resin composition will exhibit good impact resistance.

The proportion of the (meth)acrylate ester monomer(s) present in the vinyl monomer mixture (b) is preferably 50 to 85 mass %, and more preferably 65 to 75 mass %. This lower limit of the proportion of the (meth)acrylate ester monomer(s) ensures that the obtainable molded articles will attain good appearance characteristics and vibration damping properties. With the proportion being at or below the upper limit, the obtainable thermoplastic resin composition will exhibit good molding properties, heat resistance and thermal stability.

The proportion of the additional monomer(s) present in the vinyl monomer mixture (b) is preferably not more than 10 mass %, and more preferably not more than 8 mass %. This upper limit of the proportion of the additional monomer(s) ensures that the obtainable molded articles will achieve a good balance between impact resistance and appearance.

The vinyl monomer mixture (b) essentially includes aromatic vinyl monomers, and the aromatic vinyl monomers essentially include styrene and α-methylstyrene.

The proportion of styrene relative to 100 mass % of the aromatic vinyl monomers in the vinyl monomer mixture (b) is preferably 5 to 30 mass %, and more preferably 10 to 25 mass %. The proportion of α-methylstyrene relative to 100 mass % of the aromatic vinyl monomers is preferably 70 to 95 mass %, and more preferably 75 to 90 mass %.

If the proportion of styrene in the aromatic vinyl monomers is below the lower limit and that of α-methylstyrene exceeds the upper limit, the obtainable thermoplastic resin composition may be deteriorated in such characteristics as molding properties and thermal stability. If the proportion of styrene in the aromatic vinyl monomers exceeds the upper limit and that of α-methylstyrene is below the lower limit, the heat resistance of the obtainable thermoplastic resin composition may be deteriorated.

To ensure a balance between the impact resistance and the molding properties of the obtainable thermoplastic resin composition, it is preferable that the reduced viscosity of the copolymer (B) be 0.30 to 0.70 dL/g, or in particular 0.40 to 0.65 dL/g. This lower limit of the reduced viscosity of the copolymer (B) ensures that impact strength will be further increased. The above upper limit ensures good appearance of molded articles and also high molding properties. The reduced viscosity of the copolymer (B) is measured by the method described later in Examples similarly to the reduced viscosity of acetone-soluble components of the graft copolymer (A).

Similarly to the graft copolymer (A), the copolymer (B) may be produced by any method without limitation. A known method such as bulk polymerization, solution polymerization, bulk suspension polymerization, suspension polymerization or emulsion polymerization may be used. From the points of view of the color reproduction properties of the obtainable thermoplastic resin composition and also the thermal discoloration of the composition during retention, suspension polymerization is particularly preferable.

The suspension auxiliary used in the production of the copolymer (B) by suspension polymerization may be any of the anionic emulsifiers used in the production of the graft copolymer (A). From the points of view of the solubility in the composition, the stability of a solution, and the color reproduction properties of the obtainable thermoplastic resin composition and also the thermal discoloration of the composition during retention, potassium alkenylsuccinate is particularly preferable.

Similarly to the potassium alkenylsuccinate as the anionic emulsifier used in the production of the graft copolymer (A), the alkenyl group in the potassium alkenylsuccinate is a linear, branched or cyclic alkenyl group preferably having 8 to 22 carbon atoms, or more preferably 12 to 20 carbon atoms, with examples including various octenyl groups, various decenyl groups, various dodecenyl groups and various tetradecenyl groups. The potassium alkenylsuccinate may be a monopotassium salt or a dipotassium salt, but is preferably a dipotassium salt. In particular, dipotassium alkenylsuccinate salt having a $C_{12-14}$ alkenyl group is particularly preferable.

The potassium alkenylsuccinates as the suspension auxiliaries may be used singly, or two or more may be used in combination.

The potassium alkenylsuccinate as the suspension auxiliary is usually used in a ratio of 0.001 to 0.5 parts by mass, or in particular 0.001 to 0.1 part by mass relative to the total amount of the vinyl monomer mixture (b) taken as 100 parts by mass.

[Proportions of Graft Copolymer (A) and Copolymer (B)]

In the thermoplastic resin composition of the invention, the proportion of the graft copolymer (A) is 20 to 70 parts by mass, preferably 25 to 60 parts by mass, more preferably 30 to 50 parts by mass, and particularly preferably 40 to 50 parts by mass. In the thermoplastic resin composition of the invention, the proportion of the copolymer (B) is 30 to 80 parts by mass, preferably 40 to 75 parts by mass, more preferably 50 to 70 parts by mass, and particularly preferably 60 to 70 parts by mass. (The total of the graft copolymer (A) and the copolymer (B) is 100 parts by mass.)

When the proportion of the graft copolymer (A) is below the above range and that of the copolymer (B) is higher than the above range, the obtainable thermoplastic resin composition will be poor in impact resistance. When the proportion of the copolymer (B) is below the above range and that of the graft copolymer (A) is higher than the above range, the characteristics of the obtainable thermoplastic resin composition such as fluidity, heat resistance, molding properties and vibration damping properties will be deteriorated.

From the point of view of the balance of properties of the obtainable thermoplastic resin composition, the content of the rubbery polymer (a) relative to the whole of the thermoplastic resin composition is preferably in the range of 10 to 30 mass %, and more preferably in the range of 12 to 25 mass %.

[Optional Components]

In addition to the graft copolymer (A) and the copolymer (B), the thermoplastic resin composition of the invention may optionally contain α-olefin polymers such as polyethylene and polypropylene as well as copolymers of such α-olefins, styrene resins such as polystyrene and high-impact styrene, other thermoplastic resins such as polycarbonate, polybutylene terephthalate, polyethylene terephthalate, polyamide, polymethyl methacrylate, polyphenylene ether, polyphenylene sulfide, polysulfone, polyether sulfone, polyimide, polyether imide and polyether ether ketone, and various additives, reinforcing materials and fillers such as antioxidants, UV absorbers, light stabilizers, antistatic agents, lubricants, dyes, pigments, plasticizers, flame retardants, mold release agents, glass fibers, carbon fibers, metal fibers, carbon fibers, metal flakes, talcs, micas and graphites.

[Method for Producing the Thermoplastic Resin Composition]

The thermoplastic resin composition of the invention may be obtained by melt mixing the graft copolymer (A), the copolymer (B) and optionally other components to uniformity. The components may be mixed together in any sequence without limitation. All the components may be mixed together collectively at the same time, or any two or more kinds of components may be preliminarily mixed first and the remaining components may be admixed with the preliminary mixture. The melt mixing of the mixture of the components may be performed with such a device as an extruder, a Banbury mixer or a roll mill.

[Thermoplastic Resin Molded Articles]

Thermoplastic resin molded articles of the invention may be obtained by molding the inventive thermoplastic resin composition by a method such as injection molding, extrusion such as sheet extrusion or contour extrusion, vacuum forming, pressure forming, compression molding, calendering, expansion molding, blow molding and blown-film extrusion.

The thermoplastic resin composition of the invention may be also used as a material for forming a coating layer onto a substrate made of other resin, a metal or the like.

Of the materials of the substrates on which a coating layer of the inventive thermoplastic resin composition is formed, examples of the resins include rubber-modified thermoplastic resins such as ABS resins and high-impact polystyrene resins (HIPS), and thermosetting resins such as phenolic resins and melamine resins.

Coatings of the thermoplastic resin composition of the invention spread on substrates made of such resins or metals can impart excellent weather resistance and good appearance design.

The thermoplastic resin molded articles of the invention may be used in various applications. For example, the molded articles are suitably used in industrial applications, specifically, vehicle interior and exterior parts such as engine peripheral parts, trunk floor plates, tire covers, floor boxes, glove boxes, gas filler neck peripheral parts, hubcaps, door mirrors and pillars, building material parts such as wall materials and window frames, tableware, toys, home appliance parts such as vacuum cleaner housings, television housings and air conditioner housings, interior members, marine vessel members, and electrical equipment housings such as communication equipment housings, laptop housings, mobile terminal housings and liquid crystal projector housings.

EXAMPLES

The present invention will be described in further detail based on Examples hereinbelow. The scope of the invention is not limited to such Examples. In Examples below, "parts" and "%" are on mass basis unless otherwise specified.

[Measurements and Evaluations]

The properties of rubbery polymers (a), graft copolymers (A) and copolymers (B) were measured and evaluated by the following methods.

<Solid Content in Rubbery Polymer Latex>

The solid content in a rubbery polymer latex was measured by accurately weighing 1 g of the latex, evaporating volatile components at 200° C. for 20 minutes, and calculating the proportion of the residue according to the following equation.

$$\text{Solid content [\%]} = [(\text{Mass of residue})/(\text{Mass of latex})] \times 100 \quad \text{[Equation 1]}$$

<Degree of Polymerization Conversion>

The degree of polymerization conversion was obtained according to the following equation using the solid content measured above.

$$\text{Degree of polymerization conversion [\%]} = [(S \div 100) \times \{(\text{Parts by mass of all substances}) - (\text{Parts by mass of substances except monomers and water})\}/(\text{Total mass of monomers})] \times 100 \quad \text{[Equation 2]}$$

S: Solid content [%]

Parts by mass of all substances: parts by mass of all substances including monomers and water fed to reactor <Volume Average Particle Diameter>

A rubbery polymer latex was diluted with distilled water so that the loading index would be 0.1 to 100, and the volume average particle diameter was measured by a dynamic light scattering method using a dynamic light scattering particle size analyzer (model: Nanotrac UPA-EX150) manufactured by NIKKISO CO., LTD.

<Graft Ratio in Graft Copolymers (A)>

Acetone, 80 mL, was added to 2.5 g of a graft copolymer, and the mixture was refluxed in a hot water bath at 65° C. for 3 hours to extract acetone-soluble components. The residual acetone-insoluble components were separated by centrifugation and were dried. The mass thereof was measured, and the mass proportion of the acetone-insoluble components in the graft copolymer was calculated. Based on the mass proportion of the acetone-insoluble components in the graft copolymer, the graft ratio was calculated using the following equation.

Graft ratio [%]=[{(Mass proportion of acetone-insoluble components)−(Mass proportion of rubbery polymer)}/(Mass proportion of rubbery polymer)]×100                 [Equation 3]

<Reduced Viscosity of Acetone-Soluble Components of Graft Copolymers (A), and that of Copolymers (B)>

A graft copolymer or a copolymer was dissolved into N,N-dimethylformamide so that the concentration of acetone-soluble components in the graft copolymer or the concentration of the copolymer would be 0.2 dL/g. With respect to this solution, the reduced viscosity: $\eta_{sp}/C$ (unit: dL/g) was measured at 25° C. with an Ubbelohde viscometer.

[Production of Graft Copolymers (A)]

Synthetic Example 1: Production of Acid Group-Containing Copolymer Latex (K)

A reactor equipped with a reagent injection vessel, a condenser tube, a jacket heater and a stirrer was loaded with 200 parts of deionized water, 2 parts of potassium oleate, 4 parts of sodium dioctylsulfosuccinate, 0.003 parts of ferrous sulfate heptahydrate, 0.009 parts of disodium ethylenediaminetetraacetate and 0.3 parts of sodium formaldehydesulfoxylate. While performing stirring, the reactor was purged with nitrogen. Thereafter, the temperature was increased to 60° C. When the temperature reached 60° C., a mixture including 82 parts of n-butyl acrylate, 18 parts of methacrylic acid and 0.5 parts of cumene hydroperoxide was added dropwise continuously over a period of 120 minutes. After the completion of the dropwise addition, the system was aged at 60° C. for 2 hours. Thus, an acid group-containing copolymer latex (K) was obtained in which the solid content was 33%, the degree of polymerization conversion was 96% and the volume average particle diameter of the acid group-containing copolymer was 150 nm.

Synthetic Example 2: Production of Rubbery Polymer (a-1)

A reactor equipped with a reagent injection vessel, a condenser tube, a jacket heater and a stirrer was loaded with 390 parts of deionized water, 1.2 parts of dipotassium alkenylsuccinate (product name: LATEMUL ASK (Kao Corporation)), 100 parts of n-butyl acrylate, 1.2 parts of allyl methacrylate and 0.25 parts of t-butyl hydroperoxide. While performing stirring, the reactor was purged with nitrogen. Thereafter, the mixture was heated. At an inner temperature of 55° C., an aqueous solution was added which included 0.45 parts of sodium formaldehydesulfoxylate, 0.0002 parts of ferrous sulfate heptahydrate, 0.0006 parts of disodium ethylenediaminetetraacetate and 10 parts of deionized water. The polymerization was then initiated. After the generation of polymerization heat had been observed, the jacket temperature was set at 75° C. and the polymerization was performed until the generation of polymerization heat ceased. The system was held for 1 hour. A rubbery polymer latex (a-1) having a volume average particle diameter of 100 nm was thus obtained.

Synthetic Example 3: Production of Rubbery Polymer (a-2)

A reactor equipped with a reagent injection vessel, a condenser tube, a jacket heater and a stirrer was loaded with, while performing stirring, 390 parts of deionized water, 1.2 parts of dipotassium alkenylsuccinate (product name: LATEMUL ASK (Kao Corporation)), 100 parts of n-butyl acrylate, 1.2 parts of allyl methacrylate and 0.25 parts of t-butyl hydroperoxide. The reactor was purged with nitrogen, and thereafter the mixture was heated. At an inner temperature of 55° C., an aqueous solution was added which included 0.45 parts of sodium formaldehydesulfoxylate, 0.0002 parts of ferrous sulfate heptahydrate, 0.0006 parts of disodium ethylenediaminetetraacetate and 10 parts of deionized water. The polymerization was then initiated. After the generation of polymerization heat had been observed, the jacket temperature was set at 75° C. and the polymerization was performed until the generation of polymerization heat ceased. The system was held for 1 hour. The volume average particle diameter of the resultant rubbery polymer was 100 nm.

To the product, 1.2 parts in terms of solid of a 5% aqueous sodium pyrophosphate solution was added. The jacket temperature was controlled so that the inner temperature would be 70° C.

At an inner temperature of 70° C., 2.4 parts in terms of solid of the acid group-containing copolymer latex (K) was added. While keeping the inner temperature at 70° C., the mixture was stirred for 30 minutes to enlarge the product. In this manner, a rubbery polymer latex (a-2) having a volume average particle diameter of 285 nm was obtained.

Synthetic Example 4: Production of Rubbery Polymer Latex (a-3)

[Polymerization Reaction in First Stage]

A reactor equipped with a reagent injection vessel, a condenser tube, a jacket heater and a stirrer was loaded with, while performing stirring, 290 parts of deionized water, 0.96 parts of dipotassium alkenylsuccinate (product name: LATEMUL ASK (Kao Corporation)), 80 parts of n-butyl acrylate, 1 part of allyl methacrylate and 0.2 parts of t-butyl hydroperoxide. The reactor was purged with nitrogen, and thereafter the mixture was heated. At an inner temperature of 55° C., an aqueous solution was added which included 0.36 parts of sodium formaldehydesulfoxylate, 0.0002 parts of ferrous sulfate heptahydrate, 0.0006 parts of disodium ethylenediaminetetraacetate and 10 parts of deionized water. The polymerization was then initiated. After the generation of polymerization heat had been observed, the jacket temperature was set at 75° C. and the polymerization was performed until the generation of polymerization heat ceased. The system was held for 1 hour. The volume average particle diameter of the resultant rubbery polymer was 100 nm.

To the product, 1.2 parts in terms of solid of a 5% aqueous sodium pyrophosphate solution was added. The jacket temperature was controlled so that the inner temperature would be 70° C.

At an inner temperature of 70° C., 3.2 parts in terms of solid of the acid group-containing copolymer latex (K) was added. While keeping the inner temperature at 70° C., the mixture was stirred for 30 minutes to enlarge the product. The volume average particle diameter after the enlargement was 415 nm.

[Polymerization Reaction in Second Stage]

After the completion of the polymerization reaction in the first stage, at an inner temperature of 70° C., an aqueous solution was added which included 0.054 parts of sodium formaldehydesulfoxylate, 0.002 parts of ferrous sulfate heptahydrate, 0.006 parts of disodium ethylenediaminetetraacetate and 80 parts of deionized water. Next, a mixed liquid including 20 parts of n-butyl acrylate, 0.24 parts of allyl methacrylate and 0.03 parts of t-butyl hydroperoxide was added dropwise over a period of 40 minutes. After the completion of the dropwise addition, the system was held at a temperature of 70° C. for 1 hour and was thereafter cooled. Thus, a rubbery polymer latex (a-3) having a volume average particle diameter of 440 nm was obtained.

Synthetic Example 5: Production of Rubbery Polymer Latex (a-4)

A rubbery polymer latex (a-4) having a volume average particle diameter of 70 nm was obtained in the same manner as in Synthetic Example 2, except that the amounts of the dipotassium alkenylsuccinate (product name: LATEMUL ASK (Kao Corporation)), the ferrous sulfate heptahydrate and the disodium ethylenediaminetetraacetate added during the polymerization were changed to 2.00 parts, 0.001 part and 0.003 parts, respectively.

Synthetic Example 6: Production of Rubbery Polymer Latex (a-5)

A rubbery polymer latex (a-5) having a volume average particle diameter of 630 nm was obtained in the same manner as in Synthetic Example 4, except that the amounts of the 5% aqueous sodium pyrophosphate solution and the acid group-containing copolymer latex (K) added during the enlargement process were changed to 3 parts and 3 parts, respectively, in terms of solid.

Synthetic Example 7: Production of Rubbery Polymer Latex (a-6)

A reactor equipped with a reagent injection vessel, a condenser tube, a jacket heater and a stirrer was loaded with 20 parts (in terms of solid) of a styrene-polybutadiene copolymer latex having a solid content of 33% and an average particle diameter of 80 nm wherein the copolymer included 5% of styrene units and 95% of butadiene units. While performing stirring, the inner temperature was increased to 30° C. Subsequently, 0.5 parts (in terms of solid) of the acid group-containing copolymer latex (K) was added to the styrene-polybutadiene copolymer latex, and the mixture was stirred for 30 minutes. Thus, an enlarged styrene-polybutadiene copolymer latex having a volume average particle diameter of 390 nm was obtained.

To the latex was added a mixed liquid which included 79.55 parts of n-butyl acrylate, 0.3 parts of allyl methacrylate, 0.15 parts of ethylene glycol dimethacrylate and 0.2 parts of t-butyl hydroperoxide. After the mixture had been stirred sufficiently, 0.3 parts of dipotassium alkenylsuccinate (product name: LATEMUL ASK (Kao Corporation)) was dissolved. The system was purged with nitrogen to remove oxygen.

Subsequently, the inner temperature was increased to 45° C. and a mixed liquid was added which included 0.5 parts of sodium formaldehydesulfoxylate, 0.0003 parts of ferrous sulfate heptahydrate, 0.0009 parts of sodium ethylenediaminetetraacetate dihydrate and 10 parts of deionized water. Thereafter, the mixture was held at an inner temperature of 75° C. for 90 minutes while performing stirring. Thus, a rubbery polymer latex (a-6) of a composite rubber of polybutadiene rubber and n-butyl acrylate was obtained. The volume average particle diameter was 320 nm, and the degree of polymerization conversion of the rubbery polymer was 99.5%.

Synthetic Example 8: Production of Rubbery Polymer Latex (a-7)

A mixture was prepared by mixing 100 parts of EPDM (product name: TP-3180 (Mitsui Chemicals, Inc.), ethylene/propylene/diene ratio [mol %]=70/28/2), 15 parts of a low-molecular weight modified polyethylene (product name: Hi-Wax 2203A (Mitsui Chemicals, Inc.)) and 2.4 parts of potassium oleate. From the hopper of a twin-screw extruder (model: PCM-30, L/D=40) manufactured by IKEGAI, the mixture was supplied at 6 kg/h and a 15% aqueous potassium hydroxide solution was continuously supplied at 110 g/h. The resultant mixture was melt kneaded at a heating temperature of 180° C. and the melt was extruded. Subsequently, the melt was continuously fed to a cooling single-screw extruder fitted at the tip of the extruder, and was thereby cooled to 90° C. The solid extruded was placed into hot water at 85° C. and was continuously dispersed to give a rubbery polymer latex having an average particle diameter of 460 nm.

1.0 Part of t-butylcumyl peroxide (product name: PERBUTYL C (NOF CORPORATION)) and 1.0 part of divinylbenzene were added to 100 parts in terms of solid of the latex. The reaction was performed at 135° C. for 5 hours. Consequently, a crosslinked EPDM rubbery polymer latex (a-7) having a volume average particle diameter of 460 nm was obtained.

Synthetic Example 9: Production of Graft Copolymer (A-1)

A reactor equipped with a reagent injection vessel, a condenser tube, a jacket heater and a stirrer was loaded with 230 parts of deionized water (the amount includes the water in the rubbery polymer latex), 50 parts (in terms of solid) of the rubbery polymer latex (a-1), 0.5 parts of dipotassium alkenylsuccinate (product name: LATEMUL ASK (Kao Corporation)) and 0.3 parts of sodium formaldehydesulfoxylate. The reactor was thoroughly purged with nitrogen, and thereafter the inner temperature was increased to 70° C. while performing stirring.

Next, the temperature was increased to 80° C. while adding dropwise a mixed liquid including 15 parts of acrylonitrile, 35 parts of styrene and 0.5 parts of t-butyl hydroperoxide over a period of 100 minutes.

After the completion of the dropwise addition, the system was held at a temperature of 80° C. for 30 minutes and was thereafter cooled. A graft copolymer (A-1) latex was thus obtained.

Next, 100 parts of a 1.5% aqueous sulfuric acid solution was heated to 80° C. While stirring this aqueous solution, 100 parts of the graft copolymer (A-1) latex was gradually added dropwise to the aqueous solution to solidify the graft copolymer. The system was heated to 95° C. and was held for 10 minutes.

Next, the solidified product was dehydrated, washed and dried to give a powdery graft copolymer (A-1).

Synthetic Example 10: Production of Graft Copolymers (A-2) to (A-6)

Powdery graft copolymers (A-2) to (A-6) were obtained in the same manner as in Synthetic Example 9, except that the types and amounts of the rubbery polymer latex and the vinyl monomers were changed as described in Table 1.

Synthetic Example 11: Production of Graft Copolymer (A-7)

A reactor equipped with a stirrer was loaded with the rubbery polymer latex (a-7) (70 parts in terms of solid), 0.6 parts of dextrose, 0.01 part of ferrous sulfate heptahydrate, 0.45 parts of sodium ethylenediaminetetraacetate dihydrate and 150 parts of deionized water.

Next, the temperature was increased to 80° C. while performing stirring. Further, 9 parts of acrylonitrile, 21 parts of styrene and 1 part of cumene hydroperoxide were added dropwise over a period of 150 minutes, and also 1 part of potassium oleate and 30 parts of deionized water were added dropwise over a period of 180 minutes.

After the dropwise addition, the mixture was held for 1 hour while performing stirring, thereby giving a graft copolymer (A-7) latex. The degree of polymerization conversion of this graft copolymer was 98.5%. After the polymerization, a phenolic antioxidant (product name: Yoshinox 2246G (API Corporation)) and a sulfur antioxidant (product name: DLTP "Yoshitomi" (manufactured by API Corporation)) were added.

100 Parts of a 2.5% aqueous sulfuric acid solution was heated to 80° C. While stirring this aqueous solution, 100 parts of the graft copolymer (A-7) latex was gradually added dropwise to the aqueous solution to solidify the graft copolymer. The system was heated to 95° C. and was held for 10 minutes. Next, the solidified product was dehydrated, washed and dried to give a powdery graft copolymer (A-7).

The monomer compositions and structures of the graft copolymers (A-1) to (A-7) are described in Table 1.

The symbols in Table 1 below and in Table 2 described later represent the following names.
AN: acrylonitrile
ST: styrene
αMS: α-methylstyrene
MMA: methyl methacrylate

[Production of Copolymers (B)]

Synthetic Example 12: Production of Copolymer (B-1)

A pressure-resistant vessel purged with nitrogen was loaded with 120 parts of deionized water, 0.003 parts of potassium alkenylsuccinate (product name: LATEMUL DSK (Kao Corporation)) and 0.55 parts of hydroxyapatite. There was added a monomer mixture including 10 parts of acrylonitrile, 4 parts of styrene, 16 parts of α-methylstyrene, 70 parts of methyl methacrylate, 0.3 parts of 1,1,3,3-tetramethyl butylperoxy-2-ethylhexanoate (product name: PEROCTA O (NOF CORPORATION)) and 0.1 part of t-butyl peroxy-2-ethylhexyl carbonate (product name: PERBUTYL E (NOF CORPORATION)). The reaction system was brought to 65° C. while performing stirring, and thereafter the temperature was increased to 120° C. in 7 hours. The system was held at 120° C. for 2 hours, and thereby the polymerization was completed. The final degree of conversion was 99%. The reduced viscosity of the copolymer (B-1) obtained was 0.42 dL/g.

Synthetic Example 13: Production of Copolymers (B-2 to B-8)

Copolymers (B-2) to (B-8) were obtained in the same manner as in Synthetic Example 12, except that the monomers were fed in a ratio described in Table 2. The reduced viscosities of the copolymers (B-1) to (B-8) were as described in Table 2.

The production of the copolymer (B-6) failed because the polymerization stability was so poor that the product was solidified during the production.

Synthetic Example 14: Production of Copolymer (B-9)

A pressure-resistant vessel was loaded with 200 parts of deionized water, 1 part of disproportionated potassium rosinate and 0.4 parts of potassium persulfate. The reaction system was brought to 65° C. while performing stirring. Subsequently, the temperature of the reaction system was increased to 80° C. while continuously adding a monomer mixture including 25 parts of acrylonitrile and 75 parts of α-methylstyrene, and 30 parts of an aqueous emulsifier solution containing 1.5 parts of disproportionated potassium rosinate, each over a period of 5 hours. The system was held

TABLE 1

| Graft copolymer (A) | | A-1 | A-2 | A-3 | A-4 | A-5 | A-6 | A-7 |
|---|---|---|---|---|---|---|---|---|
| Rubbery polymer | Type | a-1 | a-2 | a-3 | a-4 | a-5 | a-6 | a-7 |
| | Volume average particle diameter [nm] | 100 | 285 | 440 | 70 | 630 | 320 | 460 |
| | Amount [parts] | 50 | 50 | 50 | 50 | 50 | 50 | 70 |
| Vinyl monomers | Amount [parts] AN | 15 | 15 | 15 | 15 | 15 | 15 | 9 |
| | ST | 35 | 35 | 35 | 35 | 35 | 35 | 21 |
| Structure | Graft ratio [%] | 83 | 67 | 59 | 53 | 60 | 55 | 31 |
| | Reduced viscosity of acetone-soluble components: $\eta_{sp}/C$ [dL/g] | 0.57 | 0.6 | 0.76 | 0.7 | 0.77 | 0.6 | 0.36 | at 80° C. for 1 hour, and thereby the polymerization was completed. In a separate pressure-resistant vessel, 100 parts of a 2.5% aqueous sulfuric acid solution was heated to 85° C. and thereafter 100 parts of the copolymer (B-9) latex was gradually added dropwise to solidify the copolymer. Further, the system was brought to 115° C. and was held for 10 minutes. Next, the solidified product was dehydrated, washed and dried to give a powdery copolymer (B-9). The reduced viscosity of the copolymer (B-9) obtained was 0.51 dL/g.

Synthetic Example 15: Production of Copolymer (B-10)

A copolymer (B-10) was obtained in the same manner as in Synthetic Example 14, except that the monomer composition was changed to 10 parts of acrylonitrile, 4 parts of styrene, 16 parts of α-methylstyrene and 70 parts of methyl methacrylate. The reduced viscosity of the copolymer (B-10) was 0.40 dL/g.

Synthetic Example 16: Production of Copolymer (B-11)

A copolymer (B-11) was obtained in the same manner as in Synthetic Example 12, except that the suspension auxiliary was changed from potassium alkenylsuccinate to polyvinyl alcohol. The reduced viscosity of the copolymer (B-11) was 0.43 dL/g.

The monomer compositions, the polymerization modes and the reduced viscosities of the copolymers (B-1) to (B-11) are described in Table 2.

[Production and Evaluation of Thermoplastic Resin Compositions]

Example 1

With use of SUPERMIXER (model: SMV-10B) manufactured by KAWATA MFG Co., Ltd., 40 parts of the graft copolymer (A-1), 60 parts of the copolymer (B-1) and 1.0 part of ethylene bisstearamide were mixed together. The mixture was formed into pellets with a vent twin-screw extruder (model: PCM-30) manufactured by IKEGAI that had a barrel temperature of 230° C. (Hereinafter, the pellets will be written as the "base pellets".)

Pellets for the evaluation of color reproduction properties were fabricated by adding 1 part of carbon black #960 (manufactured by Mitsubishi Chemical Corporation) as a colorant to the above blend.

These pellets were tested by the following methods to evaluate various properties, the results being described in Table 3.

<Melt Volume Rate (MVR)>

To measure the melt volume rate of the thermoplastic resin composition, the base pellets were tested at a barrel temperature of 220° C. and a load of 98 N by a method in accordance with ISO 1133. The melt volume rate is an indicator of the fluidity of the thermoplastic resin composition.

<Charpy Impact Strength>

The base pellets were molded into a 10×80×4 mm rectangular test piece (a V-notched test piece) with a 55-ton injection molding machine (model: IS55FP) manufactured

TABLE 2

| Copolymer (B) | | B-1 | B-2 | B-3 | B-4 | B-5 | B-6 |
|---|---|---|---|---|---|---|---|
| Polymerization mode | | Suspension polymerization | Suspension polymerization | Suspension polymerization | Suspension polymerization | Suspension polymerization | Suspension polymerization |
| Amounts of vinyl monomers [parts] | AN | 10 | 10 | 5 | 15 | 10 | |
| | ST | 4 | 2 | 6 | 8 | | 6 |
| | αMS | 16 | 18 | 18 | 12 | 30 | 24 |
| | MMA | 70 | 70 | 71 | 65 | 60 | 70 |
| Proportions of aromatic vinyl monomers [%] | ST | 20 | 10 | 25 | 40 | 0 | 20 |
| | αMS | 80 | 90 | 75 | 60 | 100 | 80 |
| Structure | Reduced viscosity: $\eta_{sp}/C$ [dL/g] | 0.42 | 0.45 | 0.43 | 0.41 | 0.45 | x (Solidified during polymerization) |

| Copolymer (B) | | B-7 | B-8 | B-9 | B-10 | B-11 |
|---|---|---|---|---|---|---|
| Polymerization mode | | Suspension polymerization | Suspension polymerization | Emulsion polymerization | Emulsion polymerization | Suspension polymerization |
| Amounts of vinyl monomers [parts] | AN | 23 | 25 | 25 | 10 | 10 |
| | ST | 31 | 75 | | 4 | 4 |
| | αMS | | | 75 | 16 | 16 |
| | MMA | 46 | | | 70 | 70 |
| Proportions of aromatic vinyl monomers [%] | ST | 100 | 100 | 0 | 20 | 20 |
| | αMS | 0 | 0 | 100 | 80 | 80 |
| Structure | Reduced viscosity: $\eta_{sp}/C$ [dL/g] | 0.59 | 0.61 | 0.51 | 0.40 | 0.43 | by TOSHIBA MACHINE CO., LTD. at a molding temperature of 235° C. and a mold temperature of 60° C.

The test piece was allowed to stand in an atmosphere at 23° C. and 50% humidity for at least 12 hours and was thereafter tested by a method in accordance with ISO 179 to determine the Charpy impact strength.

<Deflection Temperature Under Load>

The base pellets were molded into a 10×80×4 mm rectangular test piece with a 55-ton injection molding machine (model: IS55FP) manufactured by TOSHIBA MACHINE CO., LTD. at a molding temperature of 235° C. and a mold temperature of 60° C.

The molded article was tested by a flatwise method under 1.83 MPa and 4 mm conditions in accordance with ISO Testing Method 75 to determine the deflection temperature under load.

<Appearance>

With use of a 150-ton injection molding machine (model: SG-150) manufactured by Sumitomo Heavy Industries, Ltd. which was fitted with a mold having a shape of an automobile meter panel (one side gate), the base pellets were molded into an automobile meter panel replica illustrated in FIGURE (outside dimension: 145 mm in height, 300 mm in width, 70 mm in depth (maximum values), 3.0 mm in thickness) at a molding temperature of 250° C., a mold temperature of 60° C. and an injection rate of 50 mm/sec or 100 mm/sec. The surface appearance of the molded articles obtained was evaluated in accordance with the following evaluation criteria. In FIGURE, the reference sign 1 indicates the body of the molded article, 2 the sprue and the runner, and 3 the gate.

○: Jetting or silver streaks were substantially unnoticeable.

Δ: Jetting or silver streaks were faintly visible.

x: Jetting or silver streaks were clearly visible.

<Color Reproduction Properties>

With use of a 75-ton injection molding machine (model: J75EIIP) manufactured by The Japan Steel Works, LTD. which was fitted with a 100×100×2 mm flat sheet mold (one pin gate), the pellets for the evaluation of color reproduction properties were molded into a 100 mm×100 mm×2 mm flat sheet at a cylinder temperature of 250° C., a mold temperature of 60° C. and an injection rate of 100 g/sec. A central portion of the molded sheet was analyzed with colorimeter CM-508D manufactured by Minolta to measure the L* value. The smaller the L* value, the higher the color reproduction properties.

<Thermal Discoloration>

With use of a 75-ton injection molding machine (model: J75EIIP) manufactured by The Japan Steel Works, LTD. which was fitted with a 100×100×2 mm flat sheet mold (one pin gate), the base pellets were molded into a 100 mm×100 mm×2 mm flat sheet at a cylinder temperature of 250° C., a mold temperature of 60° C. and an injection rate of 100 g/sec. Subsequently, after the amount of the resin composition had been metered, the molding operation was suspended. The resin composition was retained in the injection molding machine for 10 minutes. Thereafter, the molding operation was resumed. A central portion of the flat sheet obtained by the fifth shot, and a central portion of the flat sheet obtained without retention were analyzed with colorimeter CM-508D manufactured by Minolta to measure the yellowness index (YI).

The degree of yellowing (ΔYI) was calculated using the equation below. The smaller the value, the higher the resistance to thermal discoloration during retention in the molding process.

Degree of yellowing (ΔYI)[%]=[(YI of flat sheet obtained by fifth shot after retention)/(YI of flat sheet obtained without retention)]×100   [Equation 4]

<Vibration Damping Properties>

With use of a 75-ton injection molding machine (model: J75EIIP) manufactured by The Japan Steel Works, LTD. which was fitted with a 100×100×2 mm flat sheet mold (one pin gate), the base pellets were molded into a 100 mm×100 mm×2 mm flat sheet at a cylinder temperature of 250° C., a mold temperature of 60° C. and an injection rate of 100 g/sec. The flat sheet was cut into a 10 mm×45 mm×2 mm strip.

The thus-obtained test piece for evaluation was tested on a dynamic viscoelasticity meter (model: DMS6100) manufactured by Seiko Instruments Inc. with a double-supported beam bending mode at 30° C. and a frequency of 1 Hz, 20 Hz or 50 Hz to measure the storage elastic modulus and the loss elastic modulus. The ratio of the loss elastic modulus to the storage elastic modulus, namely, the loss tangent (hereinafter, written as tan δ) was obtained as an indicator of vibration damping properties. The larger the value of tan δ, the higher the vibration absorbing capability and the higher the vibration damping properties.

Examples 2 to 15 and Comparative Examples 1 to 9

Base pellets of thermoplastic resin compositions, and pellets for the evaluation of color reproduction properties were obtained in the same manner as in Example 1, except that the graft copolymer (A) and the copolymer (B) were added according to the formulations described in Tables 3 and 4. The pellets were evaluated by the same methods, the results being described in Tables 3 and 4.

The following materials were used as graft copolymers (A-8) and (A-9), and copolymer (B-12).

Graft copolymer (A-8): Graft copolymer obtained by graft polymerizing acrylonitrile and styrene to a composite rubber including polyorganosiloxane and n-butyl acrylate (product name: METABLEN SX-006 (Mitsubishi Rayon Co., Ltd.))

Graft copolymer (A-9): Graft copolymer obtained by graft polymerizing methyl methacrylate and methyl acrylate to a composite rubber including polyorganosiloxane and n-butyl acrylate (product name: METABLEN S-2100 (Mitsubishi Rayon Co., Ltd.))

Copolymer (B-12): Acrylic resin (product name: ACRYPET VH-5 (Mitsubishi Rayon Co., Ltd.))

TABLE 3

| | | | Ex. 1 | Ex. 2 | Ex. 3 | Ex. 4 | Ex. 5 | Ex. 6 | Ex. 7 | Ex. 8 | |
|---|---|---|---|---|---|---|---|---|---|---|---|
| Proportions | Graft copolymer (A) | Type | A-1 | A-2 | A-3 | A-6 | A-7 | A-8 | A-9 | A-1 | A-3 |
| | | Parts | 40 | 40 | 40 | 40 | 30 | 40 | 30 | 20 | 20 |
| | Graft copolymer (B) | Type | B-1 | B-1 | B-1 | B-1 | B-1 | B-1 | B-1 | B-1 | |
| | | Parts | 60 | 60 | 60 | 60 | 70 | 60 | 70 | 60 | |

TABLE 3-continued

| Evaluation results | | | | | | | | | | |
|---|---|---|---|---|---|---|---|---|---|---|
| | MVR [cm³/10 min.] | | 7 | 10 | 11 | 13 | 11 | 9 | 13 | 12 |
| | Charpy impact strength [kJ/m²] | | 9 | 14 | 10 | 20 | 19 | 17 | 15 | 16 |
| | Deflection temperature under load [° C.] | | 72 | 72 | 73 | 72 | 72 | 71 | 69 | 73 |
| | Color reproduction properties L* | | 6.9 | 7.6 | 9.4 | 10.5 | 11.3 | 6.2 | 6.0 | 7.9 |
| | Appearance | 50 mm/sec. | ○ | ○ | ○ | ○ | ○ | ○ | ○ | ○ |
| | | 100 mm/sec. | ○ | ○ | ○ | ○ | ○ | ○ | ○ | ○ |
| | Thermal discoloration | YI before retention | 27.3 | 28.9 | 30.6 | 30.3 | 32.3 | 26.2 | 25.9 | 28.0 |
| | | YI after retention | 34.9 | 34.1 | 35.4 | 38.0 | 35.9 | 32.1 | 29.4 | 32.6 |
| | | ΔYI | 7.6 | 5.2 | 4.8 | 7.7 | 3.6 | 5.9 | 3.5 | 4.6 |
| | Vibration damping properties (tan δ) | 1 Hz | 0.048 | 0.049 | 0.044 | 0.047 | 0.053 | 0.054 | 0.060 | 0.050 |
| | | 20 Hz | 0.048 | 0.051 | 0.049 | 0.047 | 0.055 | 0.055 | 0.061 | 0.051 |
| | | 50 Hz | 0.470 | 0.050 | 0.046 | 0.048 | 0.052 | 0.055 | 0.064 | 0.050 |

| | | | Ex. 9 | Ex. 10 | Ex. 11 | Ex. 12 | Ex. 13 | Ex. 14 | Ex. 15 |
|---|---|---|---|---|---|---|---|---|---|
| Proportions | Graft copolymer (A) | Type | A-2 | A-2 | A-2 | A-2 | A-2 | A-2 | A-2 |
| | | Parts | 40 | 40 | 40 | 30 | 60 | 40 | 40 |
| | Graft copolymer (B) | Type | B-2 | B-3 | B-4 | B-1 | B-1 | B-10 | B-11 |
| | | Parts | 60 | 60 | 60 | 70 | 40 | 60 | 60 |
| Evaluation results | MVR [cm³/10 min.] | | 9 | 9 | 13 | 15 | 7 | 10 | 10 |
| | Charpy impact strength [kJ/m²] | | 11 | 8 | 13 | 8 | 19 | 10 | 11 |
| | Deflection temperature under load [° C.] | | 73 | 73 | 69 | 75 | 69 | 76 | 72 |
| | Color reproduction properties L* | | 9.3 | 9.5 | 8.7 | 7.0 | 11.4 | 15.3 | 13.9 |
| | Appearance | 50 mm/sec. | ○ | ○ | ○ | ○ | ○ | ○ | ○ |
| | | 100 mm/sec. | ○ | ○ | ○ | ○ | Δ | Δ | ○ |
| | Thermal discoloration | YI before retention | 29.2 | 27.0 | 38.2 | 25.6 | 30.8 | 33.4 | 30.6 |
| | | YI after retention | 34.4 | 30.6 | 52.4 | 30.9 | 37.5 | 42.5 | 41.2 |
| | | ΔYI | 5.2 | 3.6 | 14.2 | 5.3 | 6.7 | 9.1 | 10.6 |
| | Vibration damping properties (tan δ) | 1 Hz | 0.044 | 0.043 | 0.044 | 0.056 | 0.041 | 0.045 | 0.048 |
| | | 20 Hz | 0.046 | 0.046 | 0.040 | 0.059 | 0.044 | 0.049 | 0.049 |
| | | 50 Hz | 0.046 | 0.045 | 0.041 | 0.062 | 0.045 | 0.053 | 0.049 |

TABLE 4

| | | | Comp. EX. 1 | Comp. EX. 2 | Comp. EX. 3 | Comp. EX. 4 | Comp. EX. 5 |
|---|---|---|---|---|---|---|---|
| Proportions | Graft copolymer (A) | Type | A-2 | A-2 | A-4 | A-5 | A-2 |
| | | Parts | 15 | 75 | 40 | 40 | 40 |
| | Copolymer (B) | Type | B-1 | B-1 | B-1 | B-1 | B-5 |
| | | Parts | 85 | 25 | 60 | 60 | 60 |
| Evaluation results | MVR [cm³/10 min.] | | 21 | 2 | 5 | 11 | 5 |
| | Charpy impact strength [kJ/m²] | | 4 | 24 | 4 | 10 | 6 |
| | Deflection temperature under load [° C.] | | 77 | 65 | 72 | 72 | 76 |
| | Color reproduction properties L* | | 6.0 | 13.2 | 6.2 | 14.8 | 16.9 |
| | Appearance | 50 mm/sec. | ○ | x | ○ | ○ | ○ |
| | | 100 mm/sec. | ○ | x | ○ | x | x |
| | Thermal discoloration | YI before retention | 25.1 | 36.5 | 27.2 | 28.3 | 32.0 |
| | | YI after retention | 29.5 | 47.3 | 37.5 | 33.4 | 44.2 |
| | | ΔYI | 4.4 | 10.8 | 10.3 | 5.1 | 12.2 |
| | Vibration damping properties (tan δ) | 1 Hz | 0.057 | 0.031 | 0.044 | 0.042 | 0.039 |
| | | 20 Hz | 0.058 | 0.032 | 0.048 | 0.046 | 0.038 |
| | | 50 Hz | 0.060 | 0.032 | 0.043 | 0.050 | 0.040 |

TABLE 4-continued

|  |  |  | Comp. EX. 6 | Comp. EX. 7 | Comp. EX. 8 | Comp. EX. 9 |
|---|---|---|---|---|---|---|
| Proportions | Graft copolymer (A) | Type | A-2 | A-2 | A-2 | A-2 |
|  |  | Parts | 40 | 40 | 40 | 40 |
|  | Copolymer (B) | Type | B-7 | B-8 | B-9 | B-12 |
|  |  | Parts | 60 | 60 | 60 | 60 |
| Evaluation results |  | MVR [cm$^3$/10 min.] | 12 | 15 | 7 | 4 |
|  | Charpy impact strength [kJ/m$^2$] |  | 12 | 13 | 7 | 5 |
|  | Deflection temperature under load [° C.] |  | 68 | 75 | 79 | 72 |
|  | Color reproduction properties L* |  | 9.6 | 13.4 | 17.6 | 5.7 |
|  | Appearance | 50 mm/sec. | ○ | ○ | Δ | ○ |
|  |  | 100 mm/sec. | x | ○ | x | x |
|  | Thermal discoloration | YI before retention | 53.4 | 28.6 | 36.8 | 26.2 |
|  |  | YI after retention | 69.0 | 35.1 | 47.3 | 32.2 |
|  |  | ΔYI | 15.6 | 6.5 | 10.5 | 6.0 |
|  | Vibration damping properties (tan δ) | 1 Hz | 0.036 | 0.029 | 0.028 | 0.064 |
|  |  | 20 Hz | 0.033 | 0.028 | 0.029 | 0.074 |
|  |  | 50 Hz | 0.035 | 0.028 | 0.026 | 0.072 |

[Discussion]

The following are clear from Tables 3 and 4.

Comparative Example 1, in which the amount in parts of the graft copolymer (A) was below the lower limit specified in the range of the present invention and the amount in parts of the copolymer (B) was above the upper limit specified in the range of the present invention, resulted in poor impact resistance as compared to Examples 1 to 15. Comparative Example 2, in which the amount in parts of the graft copolymer (A) was above the upper limit specified in the range of the present invention and the amount in parts of the copolymer (B) was below the range specified in the present invention, resulted in poor fluidity, heat resistance, surface appearance of molded articles and resistance to thermal discoloration during retention as compared to Examples 1 to 15.

In Comparative Example 3, the rubbery polymer (a) in the graft copolymer (A) had a volume average particle diameter below the lower limit specified in the range of present invention, and consequently the fluidity, the impact resistance and the resistance to thermal discoloration during retention were poor as compared to Examples 1 to 3 in which the rubbery polymer (a) in the graft copolymer (A) involved the same rubber sources. In Comparative Example 4, the rubbery polymer (a) in the graft copolymer (A) had a volume average particle diameter above the upper limit specified in the claims of the present invention, and consequently the color reproduction properties and the surface appearance of molded articles were poor as compared to Examples 1 to 3 in which the rubbery polymer (a) in the graft copolymer (A) involved the same rubber sources.

In Comparative Examples 5 to 9, the monomer formulation or the component itself and also the polymerization method used to produce the copolymer (B) were outside the preferred range described in the specification. Consequently, the results obtained were unsatisfactory in any of fluidity, impact resistance, heat resistance, color reproduction properties, surface appearance of molded articles, thermal discoloration resistance and vibration damping properties as compared to Examples 2 and 8 to 11 in which the formulations of the monomers constituting the copolymer (B) satisfied the preferred range described in the specification.

The inventive thermoplastic resin compositions of Examples 1 to 15 including the graft copolymer (A) and the copolymer (B) according to the invention in the range specified in the present invention can achieve good characteristics.

INDUSTRIAL APPLICABILITY

The thermoplastic resin compositions of the present invention are highly resistant to thermal discoloration during retention in a molding process and are excellent in fluidity, impact resistance, heat resistance, surface appearance of molded articles, color reproduction properties and vibration damping properties. Thus, the thermoplastic resin compositions may be used in the fields of automobile components, building materials and home appliances which are recently growing in demand, and are therefore highly valuable in industry.

Although the present invention has been described in detail with respect to some specific embodiments, the skilled person will appreciate that various modifications are possible within the spirit and scope of the invention.

This application is based upon Japanese Patent Application No. 2014-074061 filed on Mar. 31, 2014, the entire contents of which are incorporated herein by reference.

REFERENCE SIGNS LIST

1 BODY OF MOLDED ARTICLE
2 SPRUE AND RUNNER
3 GATE

The invention claimed is:

1. A thermoplastic resin composition comprising:
   20 to 70 parts by mass of a graft copolymer (A) obtained by graft copolymerizing a vinyl monomer selected from the group consisting of unsaturated nitrile monomers, aromatic vinyl monomers and (meth)acrylate ester monomers, in the presence of a rubbery polymer (a) having a volume average particle diameter of 80 to 600 nm; and
   30 to 80 parts by mass of a copolymer (B) obtained by copolymerizing a vinyl monomer mixture including vinyl monomers of 5 to 20 mass % of unsaturated nitrile monomers, 10 to 30 mass % of aromatic vinyl monomers, 50 to 85 mass % of (meth)acrylate ester monomers, and 0 to 10 mass % of an additional vinyl monomer, the vinyl monomer mixture including 5 to 30 mass % of styrene and 70 to 95 mass % of α-methylstyrene as the aromatic vinyl monomers, and the total of the graft copolymer (A) and the copolymer (B) being 100 parts by mass.

2. The thermoplastic resin composition according claim 1, wherein the copolymer (B) is obtained by suspension polymerization.

3. The thermoplastic resin composition according to claim 2, wherein the copolymer (B) is obtained by suspension polymerization using potassium alkenylsuccinate as a suspension auxiliary.

4. The thermoplastic resin composition according to claim 1, wherein the rubbery polymer (a) is an acrylic rubber including alkyl acrylate ester monomer units and polyfunctional monomer units, or an acrylic composite rubber that includes a polyorganosiloxane and an acrylic rubber including alkyl acrylate ester monomer units and polyfunctional monomer units.

5. The thermoplastic resin composition according to claim 1, wherein the graft copolymer (A) is one obtained by graft copolymerizing 60 to 20 mass % of the vinyl monomer selected from the group consisting of unsaturated nitrile monomers, aromatic vinyl monomers and (meth)acrylate ester monomers, in the presence of 40 to 80 mass % of the rubbery polymer (a).

6. The thermoplastic resin composition according to claim 1, wherein the graft copolymer (A) has a graft ratio of 20 to 150% and a reduced viscosity of acetone-soluble components of 0.30 to 0.70 dL/g at 25° C., and the copolymer (B) has a reduced viscosity of 0.30 to 0.70 dL/g at 25° C.

7. The thermoplastic resin composition according to claim 1, wherein the content of the rubbery polymer (a) relative to the whole of the thermoplastic resin composition is in the range of 10 to 30 mass %.

8. A thermoplastic resin molded article obtained by molding the thermoplastic resin composition described in claim 1.

* * * * *